United States Patent
Abendschein

[19]

[11] Patent Number: 5,563,971
[45] Date of Patent: Oct. 8, 1996

[54] FLOATING BOTTLENECK FOR MULTIPLE POSITION FIBER OPTIC RECEPTACLE

[75] Inventor: Frederic H. Abendschein, Columbia, Pa.

[73] Assignee: The Whitaker Corporation, Wilmington, Del.

[21] Appl. No.: 431,213

[22] Filed: Apr. 28, 1995

[51] Int. Cl.$^6$ ............................................. G02B 6/38
[52] U.S. Cl. ........................... 385/55; 385/52; 385/56; 385/66; 385/70; 385/71; 385/84
[58] Field of Search ....................... 385/52, 53, 55, 385/56, 59, 60, 66, 70, 71, 72, 76, 77, 78, 84, 139

[56] References Cited

U.S. PATENT DOCUMENTS

| | | | |
|---|---|---|---|
| 3,982,815 | 9/1976 | Nakayama | 385/60 X |
| 4,166,672 | 9/1979 | Gilbert | 385/60 X |
| 4,193,665 | 3/1980 | Arnold | 385/52 X |
| 4,198,122 | 4/1980 | Prunier et al. | 385/60 X |
| 4,205,897 | 6/1980 | Stankos | 385/60 X |
| 4,258,977 | 3/1981 | Lukas et al. | 385/60 X |
| 4,277,135 | 7/1981 | Schrott et al. | 385/55 X |
| 4,279,469 | 7/1981 | Forman | 385/60 X |
| 4,445,753 | 5/1984 | Collignon | 385/60 X |
| 4,579,418 | 4/1986 | Parchet et al. | 385/60 X |
| 4,676,588 | 6/1987 | Bowen et al. | 385/60 X |
| 4,690,494 | 9/1987 | Hirose et al. | 385/60 X |
| 4,696,538 | 9/1987 | Despouys | 385/60 X |
| 4,699,458 | 10/1987 | Ohtsuki et al. | 385/59 X |
| 4,726,647 | 2/1988 | Kakii et al. | 385/60 X |
| 4,753,510 | 6/1988 | Sezerman | 385/60 X |
| 4,779,952 | 10/1988 | Hayashi et al. | 385/60 X |
| 4,805,978 | 2/1989 | Bruch et al. | 385/60 X |
| 4,881,792 | 11/1989 | Alameel et al. | 385/55 X |
| 5,073,046 | 12/1991 | Edwards et al. | 385/90 |
| 5,082,344 | 1/1992 | Mulholland et al. | 385/60 |
| 5,142,597 | 8/1992 | Mulholland et al. | 385/56 |
| 5,151,961 | 9/1992 | Hvezda et al. | 385/60 |
| 5,230,032 | 7/1993 | Muzslay | 385/66 |
| 5,257,333 | 10/1993 | Nodfelt | 385/64 |
| 5,265,182 | 11/1993 | Hartley | 385/77 |
| 5,276,750 | 1/1994 | Manning | 385/56 |
| 5,325,455 | 6/1994 | Henson et al. | 385/89 |
| 5,394,497 | 2/1995 | Erdman et al. | 385/78 |
| 5,428,703 | 6/1995 | Lee | 385/78 |

*Primary Examiner*—Brian Healy
*Attorney, Agent, or Firm*—June B. Schuette

[57] ABSTRACT

A multiple position fiber optic receptacle comprises a first receptacle member (1) joined to a second receptacle member (3). Captivated within and between the first and second receptacle members (1,3) is a coupling mechanism (17), an alignment sleeve (5), and a floating bottleneck (6). The floating bottleneck (6) permits independent adjustments of each alignment sleeve (5) relative to a ferrule to minimize the insertion force associated with ferrule to alignment sleeve misalignment. In an alternate embodiment, a floating bottleneck is removable permitting repair of the receptacle.

10 Claims, 5 Drawing Sheets

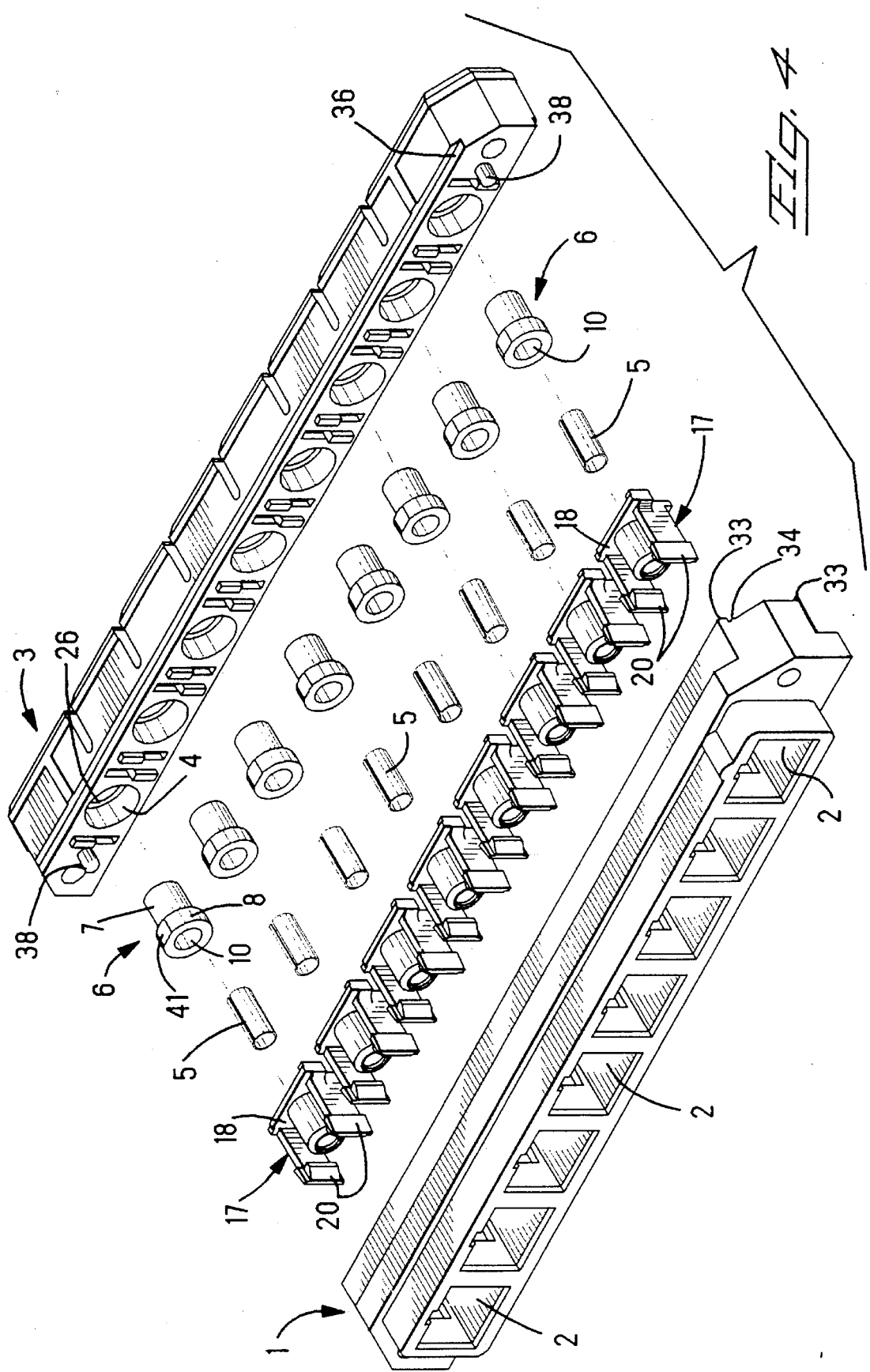

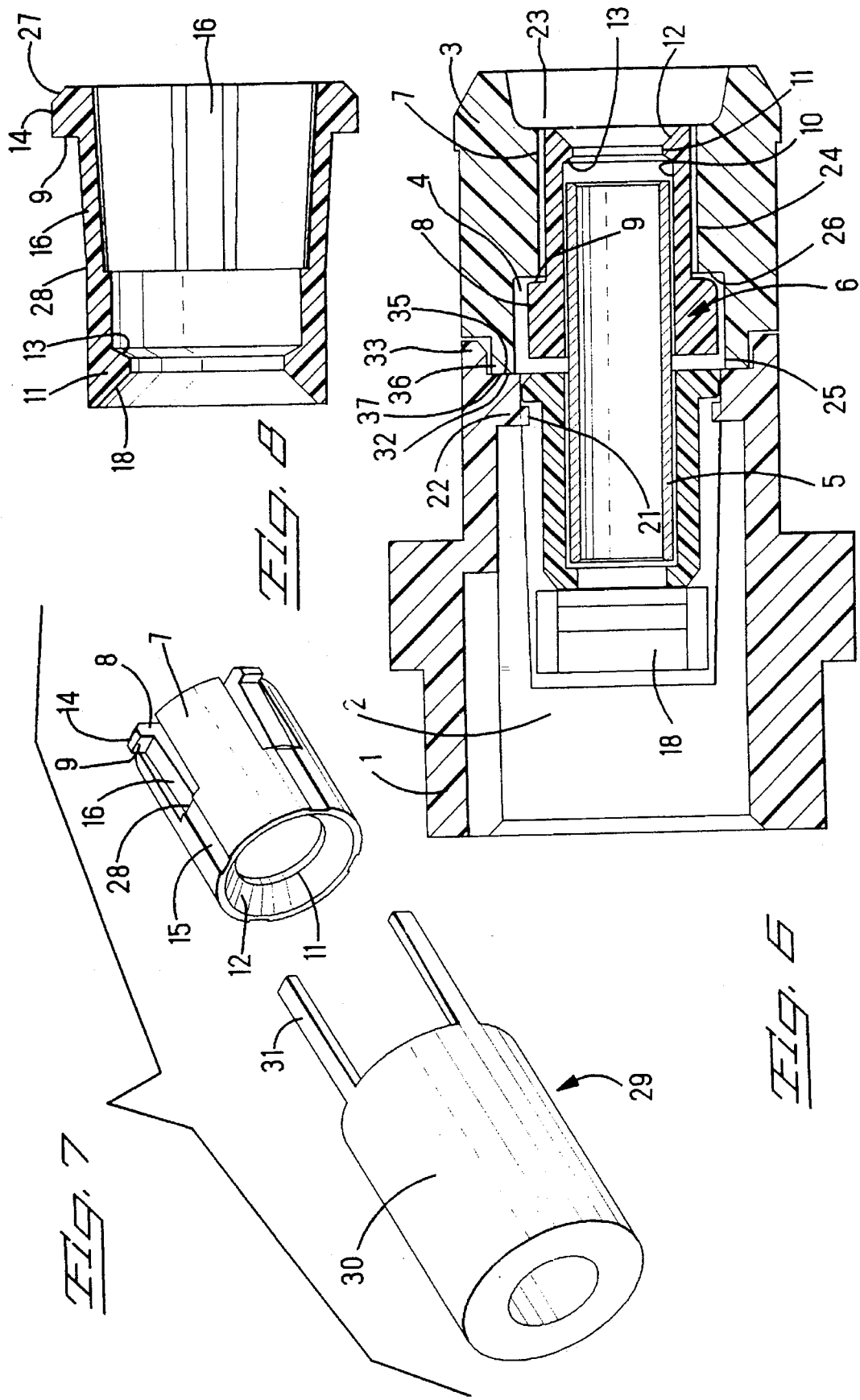

FLOATING BOTTLENECK FOR MULTIPLE POSITION FIBER OPTIC RECEPTACLE

FIELD OF THE INVENTION

This invention relates to multiple position fiber optic receptacles and the associated connectors and more specifically to a means for captivating an alignment sleeve to improve connectivity between a fiber optic receptacle and its respective connector.

BACKGROUND

U.S. Pat. No. 5,082,344 discloses a receptacle for intermating with a push-pull optical fiber connector. The receptacle comprises first and second receptacle members that receive coupling mechanism including a cantilever style catch piece. The coupling mechanism receive a cylindrical slotted alignment sleeve. The first and second receptacle members are ultrasonically joined together to captivate the catch piece and alignment sleeve therein. The alignment sleeve, as captivated, floats with respect to the coupling mechanism within some degree of freedom. With specific reference to FIGS. 1 and 2, there is further known a multiple position embodiment of the receptacle disclosed comprising first and second receptacle members having multiple positions for receiving a plurality of intermating connectors. The receptacle members are ultrasonically welded to captivate a coupling mechanism and an alignment sleeve therebetween. In an embodiment of a multiple position fiber optic receptacle, one side of the receptacle receives a fiber optic connector according to the detailed specification for the proposed standard for an SC style connector, document IEC QC 210X0/002 promulgated by IEC subcommittee no. 86B and dated May 1994. An example of a connector according to the aforementioned standard is the AMP SC fiber optic connector. The opposite side of the receptacle receives a connector carrying multiple fiber optic ferrules.

One critical aspect of fiber optic connector coupling is the proper alignment of fiber cores. It is preferred that the cores in mating ferrules be precisely coaxial when in a mated condition. To that end, it is conventional that fiber optic coupling mechanisms utilize a cylindrical alignment sleeve receiving cylindrical and opposing ferrules terminating optical fibers. For proper coaxial alignment of mating ferrules, the inner diameter of the alignment sleeve is uniform throughout and dimensioned as closely as possible to the outer diameter of the terminated ferrules. It being apparent to one of ordinary skill in the art that in order to insert the ferrule into a precisely dimensioned alignment sleeve, a certain amount of insertion force is necessary to overcome the friction between alignment sleeve and ferrule. It also being apparent to one of ordinary skill in the art that misalignment between the alignment sleeve and ferrule substantially increases the insertion force.

In the case of a multiple position fiber optic connector intermating with a multiple position fiber optic receptacle, the insertion force for each ferrule is additive. Additionally, the manufacturing tolerances associated with the ferrule to ferrule spacing and alignment sleeve to alignment sleeve spacing can cause the axis of a ferrule to the axis of its respective alignment sleeve to be misaligned. In, for example a duplex or four position arrangement, since the alignment sleeve is not rigidly captivated within the receptacle, there is a certain amount of alignment sleeve float with respect to the receptacle. The float between the alignment sleeve and the receptacle is able to accommodate and correct some misalignment as the ferrule makes initial contact with the alignment sleeve guided by a lead-in of the receptacle to urge the axis of the ferrule into coaxial alignment with the axis of the alignment sleeve. Because of the alignment sleeve to receptacle float, a certain amount of misalignment may be accommodated.

As the number of positions in the connector increases, the manufacturing tolerances of the center to center spacing of both ferrule and alignment sleeve add. As misalignment of the center axis of the ferrule to the center axis of the alignment sleeve increases, the capacity of the inherent float of the alignment sleeve in the receptacle to correct any misalignment diminishes. At some point, misalignment may cause any number of problems. Misalignment may increase the insertion force making complete connection of the receptacle and connector difficult. Misalignment may increase the insertion force to a level that can overcome the spring force in one or more of the spring loaded ferrules. If the ferrule spring force is overcome on any individual ferrule, the spring will compress, preventing the ferrule from contacting its mating ferrule. The result is either a misconnection or malconnection of one or more ferrules in the connector. Misconnection or malconnection of one ferrule in a number of ferrules of a connector is a failure mode that may not be immediately apparent. Misalignment may cause the ferrule to exert sufficient force on the alignment sleeve to damage it. Damage may necessitate replacing the entire part.

There is a need, therefore, for a rugged multiple position fiber optic receptacle with improved connectivity at lower insertion forces. There is a further need for a repairable multiple position fiber optic receptacle.

SUMMARY OF THE INVENTION

It is an object of the present invention to provide a multiple position fiber optic receptacle having improved connectivity.

It is an object of the present invention to provide a multiple position fiber optic receptacle having lower insertion force.

It is an object of the present invention to provide a rugged multiple position fiber optic receptacle.

It is an object of the present invention to provide a repairable multiple position fiber optic receptacle.

A fiber optic receptacle comprises a receptacle shell having a reception passage therethrough. An alignment sleeve is captivated within said receptacle shell. A bottleneck received within said receptacle shell prevents egress of said alignment sleeve from said receptacle shell.

It is a feature of the present invention that a bottleneck captivates an alignment sleeve within a receptacle shell.

It is a feature of the present invention that the bottleneck floats with respect to the receptacle shell.

It is a feature of the present invention that the bottleneck is removable, permitting repair of a fiber optic receptacle.

It is a feature of the present invention that within a multiple position fiber optic receptacle, individual ferrules and respective alignment sleeves align independently of each other.

It is an advantage of the present invention that the insertion force for a multiple position fiber optic receptacle is lowered without sacrificing ferrule to mating ferrule alignment precision.

It is an advantage of the present invention that a greater number of ferrule positions in a multiple position fiber optic receptacle may be accommodated for a given amount of insertion force.

It is an advantage of the present invention that should an alignment sleeve be damaged, the relatively inexpensive alignment sleeve may be replaced within the receptacle, obviating the necessity to scrap and replace a relatively expensive fiber optic receptacle.

BRIEF DESCRIPTION OF THE DRAWINGS

FIG. 4 is an exploded perspective view of a multiple position fiber optic receptacle according to the teachings of the present invention.

FIG. 5 is an exploded cross sectional view of a fiber optic receptacle according to the teachings of the present invention.

FIG. 6 is a cross sectional view of a fiber optic receptacle according to the teachings of the present invention.

FIG. 7 is a perspective view of a removable bottleneck according to the teachings of the present invention shown with its associated removal tool.

FIG. 8 is a cross sectional view of a removable bottleneck according to the teachings of the present invention sectioned through two latch members.

DETAILED DESCRIPTION OF THE PREFERRED EMBODIMENT

Figure 1:
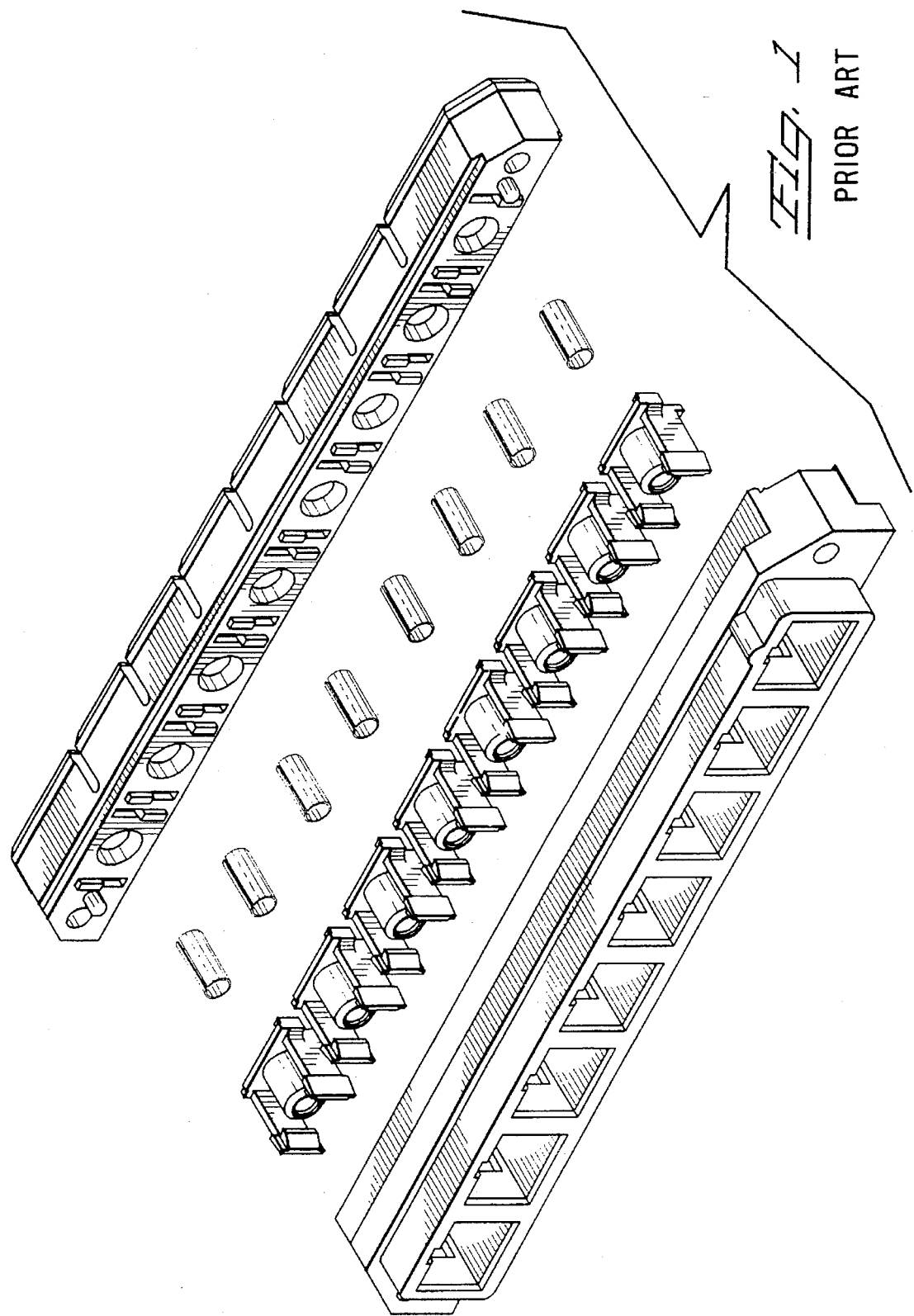
FIG. 1 is an exploded perspective view of a known multiple position fiber optic receptacle.
Figure 2:
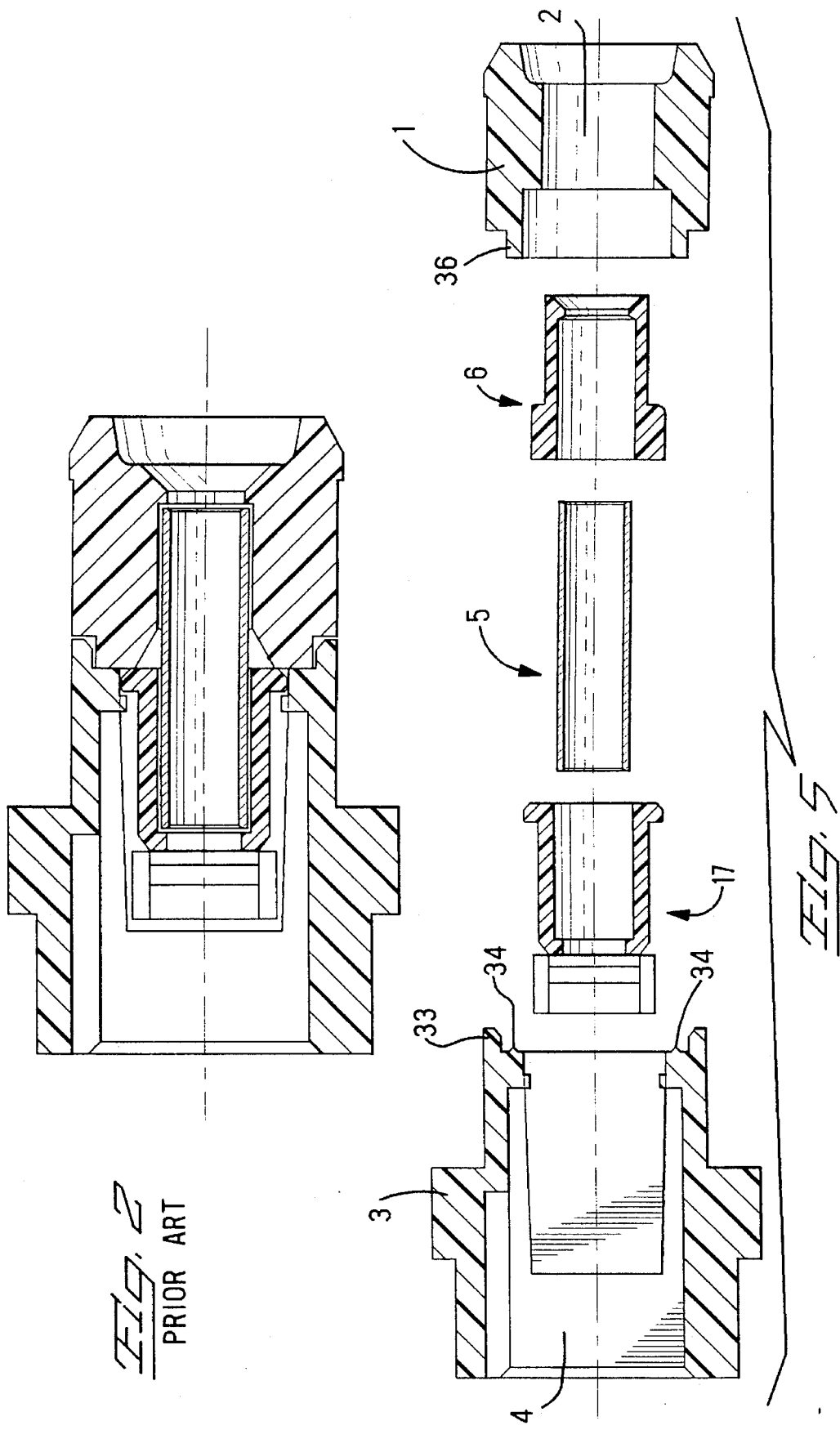
FIG. 2 is a cross sectional view of the fiber optic receptacle of FIG. 1.
Figure 3:
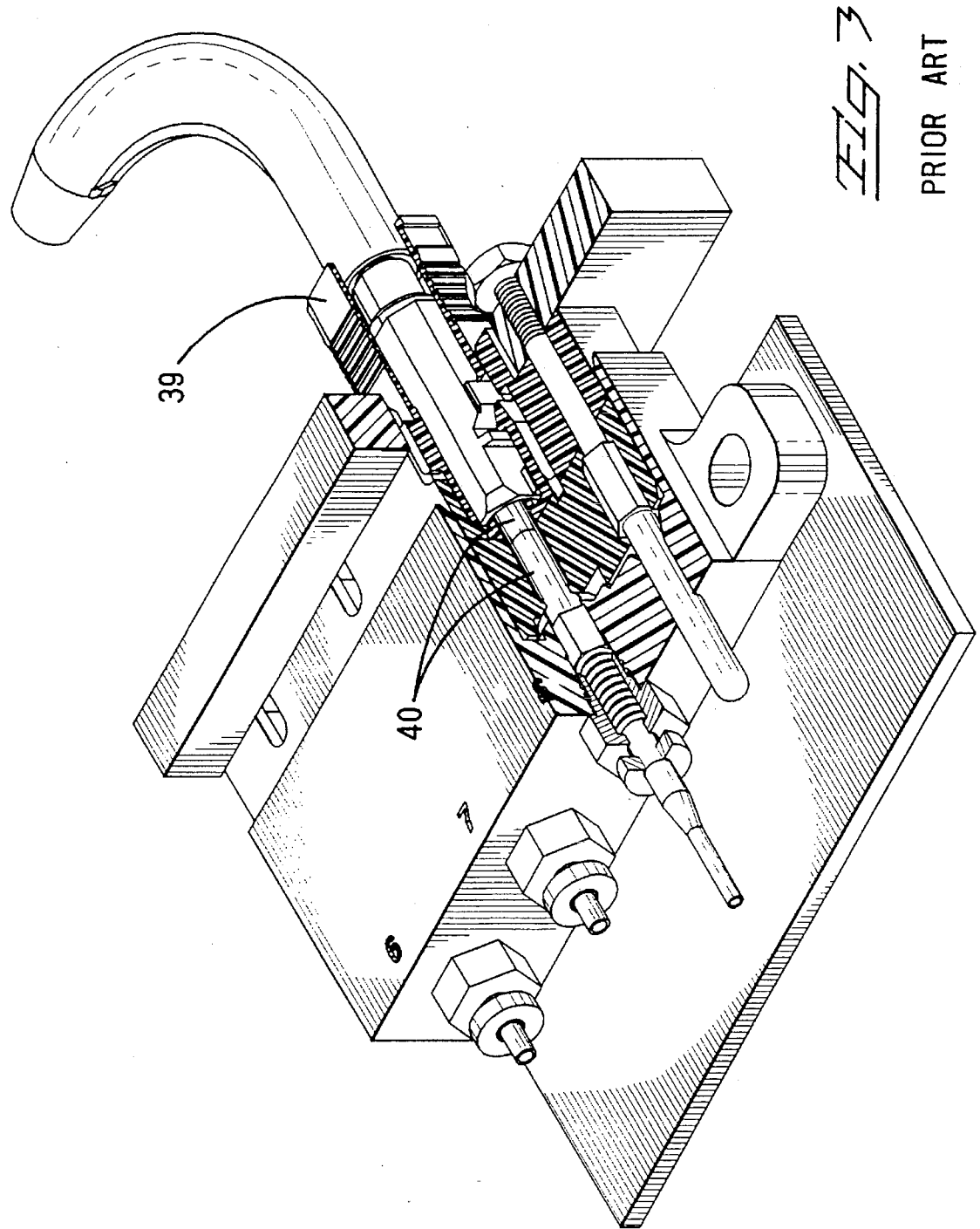
FIG. 3 is an assembled perspective view shown with partial cutaway of the fiber optic receptacle of FIG. 1 shown in relationship to a mating multiple position fiber optic connector.

An improved fiber optic receptacle takes advantage of the principle that center to center spacing of a multiple position fiber optic array is less important that the coaxial alignment of individual mating ferrules. It is advantageous for a receptacle to have a larger inner diameter relative to the outer diameter of the alignment sleeve because the resulting float of the alignment sleeve with respect to the receptacle can accommodate a certain amount of initial axial misalignment between ferrule and alignment sleeve. It is necessary for a receptacle to have a sufficiently small inner diameter in order to retain and position the alignment sleeve for proper receipt of a ferrule. As a ferrule initially engages an end of the alignment sleeve, the ferrule is able to urge the alignment sleeve to an appropriate axial position that corresponds to the position of the longitudinal axis of the ferrule. The alignment sleeve may be moved within the confines of the float afforded the alignment sleeve with respect to the receptacle. Due to the competing design considerations, the beneficial float is limited by the requirement to retain the alignment sleeve and permit initial engagement of the alignment sleeve by the ferrule.

With specific reference to FIGS. 4 and 5, a multiple position fiber optic receptacle comprises a first receptacle member 1 having multiple positions of first reception passages 2 therethrough, and a second receptacle member 3 having a respective number of multiple positions of second reception passages 4 therethrough. The first reception passage 2 receives a coupling mechanism 17, a slotted alignment sleeve 5, and a bottleneck 6. The second receptacle member 3 fits over the first receptacle member 1 so that the first and second reception passages 2,4 axially align. Two guide posts 38 on the second receptacle member 3 interfit with guide holes (not shown) on the first receptacle member 1 to aid in the proper alignment of the first and second receptacle members 1,3.

With specific reference to FIG. 6, the first receptacle member 1 has a first seam face 32 and an overhang 33. The first seam face 32 is in a plane transverse to the first reception passage 2. The overhang 33 is perpendicular to the first seam face 32. An energy director 34 having a triangular cross section, a broad side of the triangular cross section adjacent the first seam face 32, extends the length of the first seam face 32. The second receptacle member 3 has a second seam face 35 and a skirt 36. The skirt 36 fits between the two overhangs 33, so that the energy director 34 touches the second seam face. The first and second receptacle members 1,3 are held in place and are subjected to ultrasonic energy. During the ultrasonic welding operation, the energy director 33 melts to form a seam 37 between the first and second receptacle members 1,3 creating a single receptacle shell 1,3.

In the receptacle shell 1,3, first reception passages 2 axially align with respective second reception passages 4 to create multiple positions of reception passages 2,4 therethrough. The reception passages 2,4 receive mating fiber optic connectors on opposite sides of the receptacle shell 2,4. In a preferred embodiment, the first reception passage 2 receives a connector such as an AMP SC simplex 39 or duplex (not shown) connector. The first reception passage 2, therefore, has a geometry appropriately dimensioned to receive an AMP SC connector. The first and second receptacle members are injection molded out of a thermoplastic material.

The coupling mechanism 17 comprises a base 18 from which extends two opposing catch pieces 20, as is conventional in a receptacle that mates to an AMP SC style connector. A similar coupling mechanism is disclosed in U.S. Pat. No. 5,082,344, the teachings of which are specifically incorporated by reference herein. A stepped ridge comprises a first ridge 21 adjacent a smaller second ridge 22. Both of the stepped ridges extend from either side of the first receptacle member 1 into the first reception passage 2. Extremities of each first ridge 21 define a minimum internal width of the first reception passage 2. The width of the base 18 is greater than the minimum internal passage width as defined by the extremities of the first ridges 21. Extremities of each second ridge 22 define a second internal passage width of the first reception passage 2. The width of the base 18 is less than the second internal passage width and rests therewithin. When the first and second receptacle members 1,3 are ultrasonically joined, the base 18 fits in between the second ridges 22 and interferes with the first ridges 21. Interference with the first ridges 21 prevents egress of the coupling mechanism 17 through the first reception passage 2.

The second reception passage 4 comprises a receptacle entrance 23, a forward passage 24, and a rearward passage 25. The inner diameter of the forward passage 24 is less than the inner diameter of the rearward passage 25. An abrupt transition between the forward passage 24 and the rearward passage 25 creates a retention shoulder 26. The thermoplastic bottleneck 6 is received within the forward and rearward passages 24,25. The bottleneck 6 comprises a substantially tubular reception member 7 with a retention collar 8. The reception member 7 and retention collar 8 are preferably integral with each other. The retention collar 8 is an enlarged outer diameter portion of the substantially tubular retention member 7. An interference face 9 of the enlarged retention collar 8 interferes with the retention shoulder 26 to captivate the bottleneck 6 within the second reception passage 4. The outer diameter of the reception member 7 is smaller that the forward passage 24. A difference between the outer diameter of the reception member 7 and the forward passage 24 provides radial float of the reception member 7 of the bottleneck 6 relative to the second receptacle member 3. The outer diameter of the retention collar 8 is smaller than the rearward passage 25. Similarly, a difference between the outer diameter of the retention collar 8 and the rearward passage 25 provides radial float of the retention collar 8 relative to the second receptacle member 3. The maximum radial float, therefore, is limited by the minimum amount of float afforded the reception member 7 and the retention collar 8 relative to the second receptacle member 3. For proper bottleneck 6 retention, the forward passage 24 is smaller than the outer diameter of the retention collar 8. In a preferred embodiment, the maximum float of the bottleneck 6 is limited by the float afforded by the forward passage 24 relative to the outer diameter of the reception member 7. The rearward passage 25, therefore, is sufficiently sized so as to not interfere with the float of the bottleneck 6 relative to the second receptacle member 3. The float available to each bottleneck 6 is independent of the bottlenecks 6 in the remaining positions of the multiple position fiber optic receptacle. The float available in a receptacle including a bottleneck is greater than the float available if the alignment sleeve is retained solely by the receptacle. The resulting float accommodates the manufacturing tolerances in the center to center spacing of the ferrules and the relative vertical alignment of the ferrules in a multiple position fiber optic receptacle.

A bottleneck inner diameter 10 extending through the retention collar 8 and through most of the reception member 7 is of uniform size. The bottleneck 6 receives the cylindrical slotted alignment sleeve 5 within the bottleneck inner diameter 10. A bottleneck entrance 11 is at an end of the bottleneck 6 distal from the retention collar 8 and is of smaller inner diameter that the bottleneck inner diameter 10. An external facing side of the bottleneck entrance 11 is bevelled, creating a lead in 12. On an internal facing side of the bottleneck entrance 11, the bottleneck entrance 11 transitions to the bottleneck inner diameter 10. The transition from the relatively smaller inner diameter of the bottleneck entrance 11 to the relatively larger bottleneck inner diameter 10 generates a step 13. The bottleneck inner diameter 10 is appropriately sized to receive the alignment sleeve 5. In a preferred embodiment, the outer diameter of the alignment sleeve 5 is sufficiently sized relative to the inner diameter of the second receptacle member to permit some small amount of radial float and has a nominal value of 0.007 inches (0.178 mm). The step 13 serves to retain the alignment sleeve 5 within the bottleneck inner diameter 10 while permitting the float. As is conventional in the art, the more closely toleranced the fit between the outer diameter of mating ferrules of fiber optic connectors and the inner diameter of the alignment sleeve, the better the ferrule to ferrule alignment. The inner diameter of the bottleneck entrance 11 is sufficiently sized to permit entry of a cylindrical fiber optic connector ferrule 40. The step 13, therefore, must be sufficiently large to retain the floating alignment sleeve 5 and sufficiently small to permit entry of the fiber optic ferrule 40. The coupling mechanism 17 retains the alignment sleeve 5 in the first reception passage 2 through interference with a coupling mechanism step 19. There is enough length between the coupling mechanism step 19 and bottleneck step 13 to receive the length of the alignment sleeve and permit a certain amount of axial float of the alignment sleeve relative to the coupling mechanism 17 and bottleneck 6. In a preferred embodiment, there is a nominal value of 0.039 inches (0.990 mm) of axial float afforded the alignment sleeve 5 between the step 13 and the coupling mechanism step 19. The bottleneck 6 is molded with a flat 41 on the retention collar 8 in order to leave room for the gate vestige.

In an alternative embodiment, the bottleneck 6 is removable for purposes of replacement of the alignment sleeve 5. With specific reference to FIG. 7 of the drawings, the removable bottleneck further comprises four independently cantilevered beams 16. The beams 16 are positioned equidistant from each other around the periphery of the reception member 7. Each beam 16 is fixedly attached to the reception member 7 at a fixed end 28, and has a latch member 14 at an end distal from the fixed end 28 of the beam 16. A channel 15 aligns with each beam 16, beginning at the bottleneck entrance 11 and ending at the fixed end 28. The channel 15 is substantially the same width as its respective beam 16. The outer surface of the beams 16 tapers outwardly from the bottom of the channel 15 at the fixed end 28 to be congruent with the outer diameter of the reception member 7 adjacent the latch member 14. The inner diameter of the removable bottleneck embodiment is substantially identical to the inner diameter of the nonremovable bottleneck embodiment. In the removable bottleneck embodiment the interference face 9 of each of the four latch members 14 interferes with the retention shoulder 26 to retain the bottleneck 6. The removable bottleneck 6 is positioned within the second receptacle member 3 in the same way as the nonremovable bottleneck embodiment described hereinabove. The combination of the interference faces 9, therefore, performs the same retention function as the interference face 9 of the retention collar 8.

For use with a removable bottleneck, a removable bottleneck tool 29 comprises a handle 30 and prongs 31. The prongs 31 are dimensioned and spaced to be received within the channels 15 when the removable bottleneck 6 is installed in the fiber optic receptacle shell 1,3. An inner distance of prong 31 to prong 31 is substantially equal to an outer diameter of the reception member 7. To remove the bottleneck, one grasps the handle 30 to position the tool 30 at a bottleneck entrance 11 so that each prong 31 engages its respective channel 15. The tool 29 is then inserted into the second receptacle member 3 causing the prongs 31 to extend toward the beams 16 eventually to engage the fixed ends 28. As the tool 29 extends further toward the latch members 14, the inner surface of the prong 31 engages the outer surface of the respective beam 16. Due to the outward taper of the outer surface of the beams 16, the prongs 31 urge the beams inwardly. The prongs 31 extend into the second receptacle member 3 until the latch members 11 are sufficiently deflected to clear the retention shoulder 26. When the bottleneck 6 is removed, there is nothing to captivate the alignment sleeve 5. The alignment sleeve 5 may be removed by gravity, positioning the receptacle until the alignment sleeve falls out. A new alignment sleeve 5 is dropped into the second reception passage 4. Approximately half of the alignment sleeve is received by the coupling mechanism 17 until an edge of the alignment sleeve engages the coupling mechanism step 19. Receipt of the alignment sleeve 6 by the coupling mechanism 17 positions the alignment sleeve 6 upright and centered in the second reception passage 4. The end of the removable bottleneck 6 having the retention collar 8 thereon is positioned at the receptacle entrance 23. Tapered engagement surfaces 27 engage the receptacle. As the removeable bottleneck is urged further into the receptacle, the engagement surfaces cause the latch members 14 and beams 16 to deflect inwardly. With the beams 16 deflect inwardly, the bottleneck 6 is of sufficient outer diameter to be received within the forward passage 24. The bottleneck 6 enters the receptacle until the latch members 14 enter the rearward passage 25 and the beams 16 return to their undeflected state. This latches the removeable bottleneck into the receptacle shell 1,3.

Upon initial interconnection of the multiple position fiber optic receptacle with a multiple position fiber optic connector, the tolerancing is such that each ferrule engages the bottleneck 6 at some point on the lead in 12. At intermediate stages of the interconnection, the float in each bottleneck 6 permits the respective ferrules, each engaging its respective lead in 12, to urge the bottleneck 6 to a particular radial position having the lowest insertion force for the individual ferrule. Each ferrule in combination with its respective floating bottleneck 6 permits independent adjustments of each bottleneck 6. The individual adjustments to a position of minimum insertion force minimizes the aggregate insertion force of the multiple position ferrule connector with the receptacle. The float of the bottleneck takes advantage of the beneficial aspects of alignment sleeve float, and permits a greater degree of float without sacrificing the beneficial aspects of a rigid and closely toleranced alignment sleeve inner diameter.

I claim:

1. A fiber optic receptacle comprising:
   a receptacle shell having a reception passage therethrough,
   a bottleneck floatably received within said receptacle shell, and
   an alignment sleeve held at least partially within said bottleneck.

2. A fiber optic receptacle as in claim 1 wherein said receptacle shell comprises multiple reception passages (2,4) therethrough.

3. A fiber optic receptacle as in claim 1 wherein said receptacle shell comprises a first receptacle member (1) and a second receptacle member (3) ultrasonically welded together.

4. A fiber optic receptacle as in claim 1 wherein said bottleneck (6) comprises a reception member (7) and a retention collar (8) thereon.

5. A fiber optic receptacle as in claim 1 wherein said bottleneck (6) floats with respect to said reception passage (2,4) by virtue of a clearance between an inner circumference of said reception passage (2,4) and an outer periphery of said bottleneck (6).

6. A fiber optic receptacle as in claim 1 wherein an entrance (9) to said bottleneck is bevelled (10).

7. A fiber optic receptacle as in claim 1 wherein said bottleneck (6) comprises a latch member (14) retaining said bottleneck within said receptacle shell (1,3).

8. A fiber optic receptacle as in claim 7 wherein said bottleneck (6) comprises a plurality of said latch members (14).

9. A fiber optic receptacle as in claim 7 wherein said bottleneck (6) further comprises channels (15) on a periphery of said reception member (7).

10. A fiber optic receptacle as in claim 9 wherein said channels (15) are axially aligned with said latch members (14).

* * * * *